United States Patent
Guo et al.

(10) Patent No.: US 11,237,258 B1
(45) Date of Patent: Feb. 1, 2022

(54) METHOD FOR OPTIMIZATION OF A PARAMETRIC ARRAY SHALLOW PROFILE DIFFERENCE FREQUENCY CONVERSION PERFORMANCE

(71) Applicant: Hunan Guotian Electronic Technology Co., Ltd., Changsha (CN)

(72) Inventors: Shijian Guo, Changsha (CN); Qinglin Zhai, Changsha (CN); Zhiwei Xiao, Changsha (CN); Xin Chen, Changsha (CN); Lu Chen, Changsha (CN); Luan Jiang, Changsha (CN)

(73) Assignee: HUNAN GUOTIAN ELECTRONIC TECHNOLOGY CO., LTD., Changsha (CN)

( * ) Notice: Subject to any disclaimer, the term of this patent is extended or adjusted under 35 U.S.C. 154(b) by 0 days.

(21) Appl. No.: 17/396,782

(22) Filed: Aug. 9, 2021

(30) Foreign Application Priority Data

Oct. 13, 2020 (CN) .......................... 202011087695.3

(51) Int. Cl.
*G01S 7/521* (2006.01)
*G01N 29/34* (2006.01)
(Continued)

(52) U.S. Cl.
CPC ............ *G01S 7/539* (2013.01); *G01N 29/348* (2013.01); *G01S 7/521* (2013.01); *G01S 15/88* (2013.01); *G01N 2291/02491* (2013.01)

(58) Field of Classification Search
CPC .......... G01S 7/539; G01S 7/521; G01S 15/88; G01N 29/348; G01N 2291/02491
(Continued)

(56) References Cited

U.S. PATENT DOCUMENTS

| 6,842,401 B2 * | 1/2005 | Chiang | ................... G01S 7/521 367/138 |
| 8,576,666 B1 * | 11/2013 | Foley | ..................... G01L 11/04 367/131 |

(Continued)

FOREIGN PATENT DOCUMENTS

| CN | 101738611 A | 6/2010 |
| CN | 101984555 A | 3/2011 |

(Continued)

*Primary Examiner* — Jacques M Saint Surin

(57) ABSTRACT

A method for optimization of a parametric array shallow profile difference frequency conversion performance, comprising the following steps: building a three-layer parametric array shallow profile emission acoustic wave propagation path model, and establishing a detection horizontal position DL equation capable of detecting a detection performance of the parametric array shallow profile; and building a model for optimization of the parametric array shallow profile difference frequency conversion performance. A parametric receiving array includes the receiving hydrophone and a pump transducer, comprising: a silicone rubber column is added between the receiving hydrophone and the pump transducer to improve the conversion efficiency of the parametric receiving array. The present disclosure improves the conversion efficiency of the parametric receiving array by increasing the high-frequency power and acoustic pressure level and reducing the ratio to improve the conversion efficiency and the parameter receiving array uses silicone rubber columns.

7 Claims, 4 Drawing Sheets

(51) Int. Cl.
*G01S 15/88* (2006.01)
*G01S 7/539* (2006.01)

(58) Field of Classification Search
USPC .......................................................... 367/87
See application file for complete search history.

(56) References Cited

U.S. PATENT DOCUMENTS

2005/0157760 A1    7/2005  Rice et al.
2010/0020990 A1*  1/2010  Moon ..................... B06B 3/00
                                                                                                                          381/161

FOREIGN PATENT DOCUMENTS

| CN | 103575377 | A |   | 2/2014  |           |
|----|-----------|---|---|---------|-----------|
| CN | 110637516 | B |   | 6/2014  |           |
| CN | 103713283 |   | * | 9/2014  | G01S 7/521 |
| CN | 104062645 | A |   | 9/2014  |           |
| CN | 104077479 | A |   | 10/2014 |           |
| CN | 104156607 | A |   | 11/2014 |           |
| CN | 110749926 | A |   | 2/2020  |           |
| CN | 110780303 |   | * | 2/2020  | G01S 15/93 |
| CN | 110933558 | A |   | 3/2020  |           |
| CN | 111273301 | A |   | 6/2020  |           |
| CN | 112198515 | A | * | 1/2021  | G01S 15/88 |
| JP | 2000249760 | A |   | 9/2000  |           |

* cited by examiner

METHOD FOR OPTIMIZATION OF A PARAMETRIC ARRAY SHALLOW PROFILE DIFFERENCE FREQUENCY CONVERSION PERFORMANCE

CROSS-REFERENCE TO RELATED APPLICATIONS

The application claims priority to Chinese patent application No. 202011087695.3, filed on Oct. 13, 2020, the entire contents of which are incorporated herein by reference.

TECHNICAL FIELD

The present disclosure belongs to the technical field of ocean sonar, specifically relates to a method for optimization of a parametric array shallow profile difference frequency conversion performance.

BACKGROUND

In modern times, marine development activities are increasing, and the exploration and development of marine resources has become the main battlefield for competition among contemporary countries. Coastal marine engineering construction is an important support for national defense and economic development. The construction of marine engineering is based on understanding the submarine strata structure, detecting the properties of the strata, and the structure of sediments. The shallow profile meter is used to measure the frequency response of seabed sediments, the formation attenuation coefficient, the propagation medium impedance, the acoustic velocity and other formation parameters. If appropriate identification methods are adopted, the shallow profile meter can become a geological exploration sonar with both bottom quality identification and seabed detection function, and the shallow profile meter can effectively detect the thickness of the seabed sedimentary layer, the fault structure, and the bedrock depth, and at the same time detect the distribution of obstacles on the seabed, and hold the disasters and geological conditions of the sea area (landslides, shallow gas), providing more accurate and detailed geological data for the laying of underwater pipelines and the construction of some offshore projects (such as docks, power stations, bridges, artificial islands, etc.).

Acoustic parameter array is a mathematical expression and physical model of a transmitting device analysis parameter array which uses nonlinear acoustic phenomena to generate difference frequency signals in the far field of the sound field. However, the parametric array has some problems in the difference frequency conversion during the application process: 1) The difference frequency conversion efficiency of the parametric array is low; 2) In order to achieve non-linear acoustic effects, the original sound source is required to have a higher energy level, which results in excessive transmission power of the transducer.

SUMMARY

Aiming at the above mentioned defects, the present disclosure provides a method for optimization of a parametric array shallow profile difference frequency conversion performance formed by building a three-layer model sonar equation to detect the parametric array shallow profile detection performance, and then building a model for optimization of the parametric array shallow profile difference frequency conversion performance to increase the power and acoustic pressure level of the high-frequency, and reducing the ratio to improve the conversion efficiency, and a parametric receiving array using silicone rubber column.

The method for optimization of a parametric array shallow profile difference frequency conversion performance, comprising the following steps:

S1: building a three-layer parametric array shallow profile emission acoustic wave propagation path model, the three-layer parametric array shallow profile emission acoustic wave propagation path model includes a water layer, a sedimentary layer and a rock layer; the sedimentary layer is a pore fluid formed by particles, and establishing a detection horizontal position DL equation capable of detecting a detection performance of the parametric array shallow profile and estimating an echo level at a ground profile and a top of a rock formation:

$$DL = SL - (PG + DL_{W \cdot S} + AL_W) - TL_{W \cdot S} - AL_S - RL_{S \cdot R} - TL_{S \cdot W} + RVS + RG + SPG;$$

the SL is a horizontal position of an acoustic wave emission source, the PG is a generation efficiency from an initial wave frequency to the difference frequency, the $DL_{W \cdot S}$ is a diffusion loss of an initial wave in a water and the sedimentary layer, and the $AL_W$, is an absorption loss of the initial wave in the water, and a unidirectional wave propagation between a transducer and a surface of a sediment is regarded as a nonlinearity and a wave propagation of the transducer reflected from the surface of the sediment is regarded as a linearity; the $TL_{W \cdot S}$ is a transmission loss of the initial wave at a boundary between the water layer and the sedimentary layer and the $TL_{S \cdot W}$ is the transmission loss of an echo at the boundary between the water layer and the sedimentary layer; the $AL_S$ is the absorption loss of the initial wave in the sediment; the $RL_{S \cdot R}$ is a reflection loss at the boundary between the sediment and the rock layer; the RVS is a voltage sensitivity of an acoustic echo receiving hydrophone; the RG is a gain of the receiving hydrophone; and the SPG is a signal processing gain of the receiving hydrophone;

S2: building a model for optimization of the parametric array shallow profile difference frequency conversion performance and calculating a low-frequency wave radiation power $W_{ed}$:

$$W_{ed} = \frac{\rho_f e^{\alpha_S r}}{2 \rho_S c_S} 4\pi r;$$

$$= \frac{w^4 \beta^2 w_1 w_2}{2\pi \rho_S c_S^7 \gamma};$$

a propagation distance of the acoustic wave in water is r, the propagation distance in the sediment is d; and a propagation speed of the acoustic wave in water is $c_R$, the propagation speed of the acoustic wave in the sediment is $c_S$, and the propagation speed of the acoustic wave in a rock is $c_W$, the unit is m/s, a water density is $\rho_W$, a sediment density is $\rho_S$, and a rock density is $\rho_R$ and the unit is kg/m³; an attenuation coefficient of the acoustic wave absorbed in the sediment is $\alpha_S$, and unit is dB/m; the $\beta$ is a porosity of the sediment, the e is an expansion rate of a member attached to the model for optimization of the parametric array shallow profile difference frequency conversion performance, and the $\gamma$ is a structure factor of a transmitted acoustic wave propagation path model;

wherein, the $w_1$ and the $w_2$ are frequencies of two high-frequency frequencies respective since the frequencies of two high-frequency frequencies are similar, $$W_1 = W_2 = \frac{W}{2}$$

and the w is a total radiated wave frequency; the $\rho_f$ is a pore fluid density in the sediment, and $\rho_s = \beta\rho_f + (1-\beta)\rho_g$ and the $\rho_g$ is a particulate matter density in the sediment:

S3: calculating a low-frequency wave conversion efficiency, and the low-frequency wave conversion efficiency is a ration of a low-frequency wave frequency $W_{ed}$ to a total radiated wave frequency W:

$$\frac{W_{ed}}{W} = 2\pi^3 \beta^2 f_d^4 W / \rho_S c_S^7 \gamma^2;$$

the $f_d$ is a differential frequency;

S4: adjusting and increasing a high-frequency power and a high-frequency acoustic pressure level and reducing the ratio $$\frac{W_{ed}}{W} = 2\pi^3 \beta^2 f_d^4 W / \rho_S c_S^7 \gamma^2$$

to improve a conversion efficiency $$\frac{W_{ed}}{W}.$$

Further, under the condition that the acoustic wave emission source is 1 m away from the transducer and a bidirectional distance diffusive loss is −6 db/DD, the ALS=$2\alpha_S$d DLW·S=20 log 2(r+d), and ALS=$2\alpha_S$d.

Further, an acoustic wave loss caused by going back and forth between a water surface and the sediment is a sum of $TL_{W \cdot S}$ and $TL_{S \cdot W}$:

$$TL_{W \cdot S} + TL_{S \cdot W} = -20 \log 2(1+R_{W \cdot S})(1-R_{W \cdot S}), \text{ and}$$

$$R_{W \cdot S} = \frac{\rho_S c_S - \rho_W c_W}{\rho_S c_S + \rho_W c_W};$$

and the $R_{W \cdot S}$ is a reflection coefficient at the water surface and the sediment.

Further, the $RL_{S \cdot R} = -20 \log(R_{S \cdot R})$, $$R_{S \cdot R} = \frac{\rho_R c_R - \rho_S c_S}{\rho_R c_R + \rho_S c_S};$$

the $R_{S \cdot R}$ is the reflection coefficient at the sediment and the rock.

Further, the echo has a transmission loss and the reflection losses in the sediment, the transmission loss and the reflection losses in an echo sediment are related to the $\rho_S$, $c_S$ and $\alpha_S$, and establishing a Biot-Stoll model to calculate $\rho_S$, $c_S$ and $\alpha_S$:

$$\nabla^2 (He - C\xi) = \frac{\partial^2}{\partial t^2}(\rho e - \rho_f \xi);$$

$$\nabla^2 (He - M\xi) = \frac{\partial^2}{\partial t^2}(\rho_f e - m\xi) - \frac{F\eta}{k}\frac{\partial \xi}{\partial t};$$

wherein, the expansion rate of a member attached to the model for optimization of the parametric array shallow profile difference frequency conversion performance is e=div(u, U), and a fluid volume flowing into or out of a volume unit attached to the model for optimization of the parametric array shallow profile difference frequency conversion performance is $\xi = \beta$ div(u-U,U), the $\beta$ is the porosity of the sediment, the u is a position after the parametric array shallow profile is moved, the U is the position after the pore fluid is moved and the $\eta$ is a flow velocity of the pore fluid; the div function is a result of finding a quotient and a remainder of two parameters; the H is a calculation weighting parameter of the expansion rate e, the C is the calculation weighting parameter of the fluid volume $\xi$ flowing into or out of a volume unit attached to the model for optimization of the parametric array shallow profile difference frequency conversion performance, the M is the calculation weighting parameter of a volume variation of the fluid volume $\xi$, and the m is the structure factor of the transmitted acoustic wave propagation path model.

Further, the H formula is as following:

$$H = \frac{(K_g - K_b)^2}{D - K_b} + K_b + \frac{4}{3}u;$$

the $K_b$ is a frame bulk modulus, and the $K_g$ is a particle bulk modulus;

the C formula is as following:

$$C = \frac{K_g(K_g - K_b)}{D - K_b};$$

the M formula is as following:

$$M = \frac{K_g^2}{D - K_b};$$

the m formula is as following:

$$m = \gamma \frac{\rho_f}{\beta};$$

the D formula is as following:

$$D = K_g\left[1 + \beta\left(\frac{K_g}{K_f} - 1\right)\right];$$

the $K_f$ is the bulk modulus of the pore fluid.
Further, the γ formula is as following:

$$\gamma = 1 + g\left(\frac{1-\beta}{\beta}\right)$$

and the g is a radius of the particles in the sediment.

The present disclosure provides a parametric receiving array adopting the method for optimization of a parametric array shallow profile difference frequency conversion performance, and the parametric receiving array includes the receiving hydrophone and a pump transducer, comprising: a silicone rubber column is added between the receiving hydrophone and the pump transducer to improve the conversion efficiency of the parametric receiving array.

The beneficial effects of the present disclosure are the following:

1. detecting the parametric array shallow profile detection performance by building a three-layer model sonar equation and then building a model for optimization of the parametric array shallow profile difference frequency conversion performance to calculate the low-frequency wave conversion efficiency. The low-frequency wave conversion efficiency is the ration of the low-frequency wave frequency $W_{ed}$ to the total radiated wave frequency W. The goal of optimization can be achieved by improving the power and acoustic pressure level of the high-frequency and reducing the ratio aiming to improve conversion efficiency. By changing the medium and a usage acoustic velocity, the conversion efficiency of a medium with a low density and larger nonlinear coefficient can also be improved.

2. By choosing the silicone rubber with greater nonlinear parameters and lower acoustic velocity to be added between the pump transducer and the receiving hydrophone, the conversion efficiency is improved and optimized. And by changing the medium, not only can a better conversion efficiency be avoided by simply increasing the power, but also the equivalent length will not be limited and the difference frequency beam will not be widened.

3. The physical parameters in the sediments vary with the types of sediments and have an impact on the DL. Therefore, using the Biot-Stol model to calculate the density $\rho_S$ in physical parameters sediments, acoustic wave propagation velocity $c_S$ and the attenuation coefficient $\alpha_S$ of acoustic wave absorbed in sediments can effectively correct the frequency calculation accuracy of the acoustic waves in the sediment and ensure the frequency calculation accuracy of the acoustic waves will not change due to the different types of sediments, which will affect the detection level DL of the parametric array, and avoid the inaccuracy of the final applied nonlinear parameters, resulting in inconspicuous optimization of conversion efficiency.

DETAILED DESCRIPTION OF THE EMBODIMENTS

Figure 1:
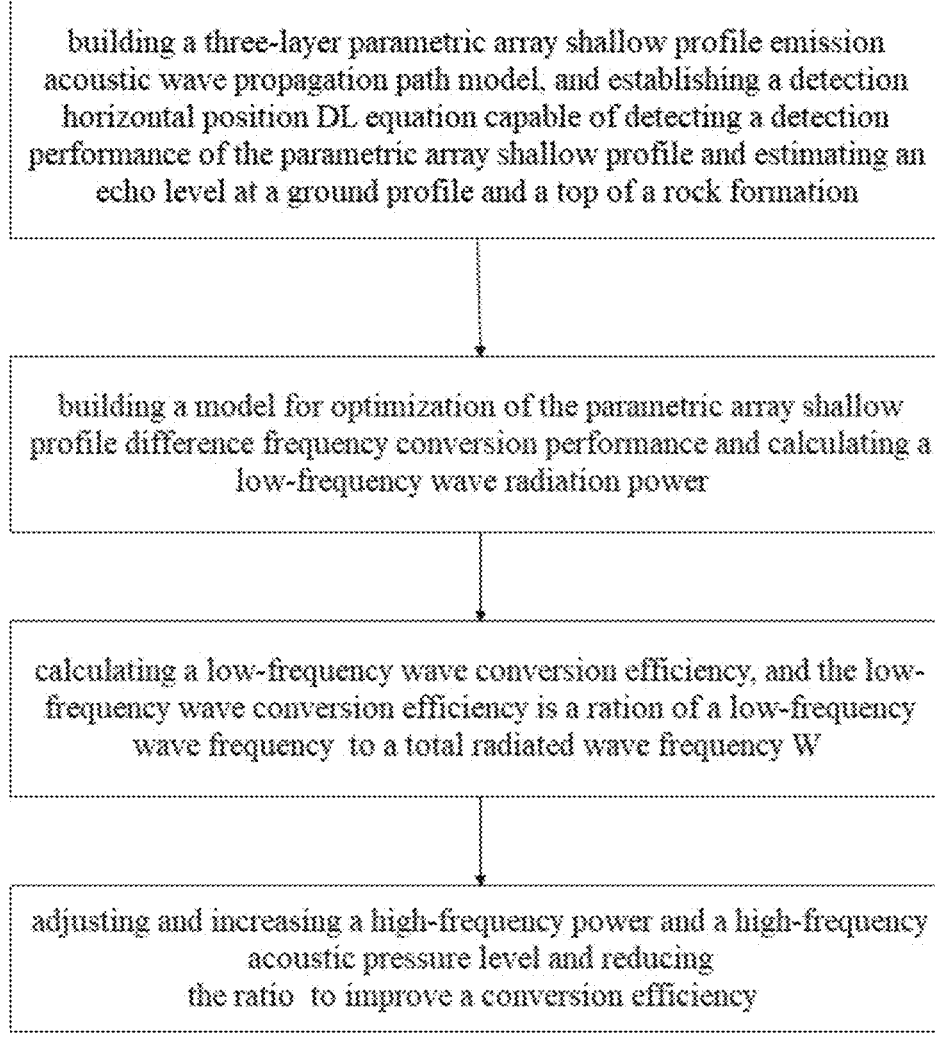
FIG. 1 is a schematic diagram of the optimization method.

The following content will clearly and completely describe the technical solutions in the embodiments of the present disclosure with reference to the accompanying drawings in the embodiments. Obviously, the described embodiments are only a part of the embodiments of the present disclosure, rather than all the embodiments. Based on the embodiments of the present disclosure, all other embodiments obtained by those of ordinary skill in the art without creative work shall fall within the protection scope of the present disclosure.

The parametric array transmits two signals by a slightly different high frequency at a high acoustic pressure. Under high acoustic pressure, the non-linear characteristics of the acoustic propagation of the two signals, interactions and new frequencies (sum frequency, difference frequency, and harmonics) increase; and the difference in the emission frequency is called the secondary frequency. The parametric array is a base array that uses two high-frequency acoustic waves with similar frequencies to produce a nonlinear effect in the water medium, forming a difference frequency narrow beam. Usually two close transmitting transducers are used as primitives to respectively emit high-frequency sinusoidal acoustic waves with close frequencies, and when the acoustic amplitude is large enough, the water medium produces a nonlinear effect, and the acoustic velocity is no longer constant, but a function of pressure. When the acoustic amplitude increases positively, the acoustic velocity increases, and when the acoustic amplitude increases negatively, the acoustic velocity decreases, which distort the sine wave into a sawtooth wave, and form an interaction zone at a certain distance from the sound axis of the transmitter array, generating two high-frequency sum frequency, difference frequency and other combined frequencies. But the frequencies of the two high-frequency sum frequency, difference frequency and other combined frequencies are similar, the difference frequency wave is lower than the acoustic source frequency and the sum frequency of the two. During propagation, the high-frequency acoustic waves decay rapidly, leaving only difference frequency waves.

The difference frequency conversion efficiency of the parametric array is related to different media. When the transmitted wave frequency, total radiated wave frequency and difference frequency are fixed, the conversion efficiency in fresh water is generally higher than that in sea water, and the conversion efficiency in air is higher than that in fresh water. The conversion efficiency can be improved by increasing the power and acoustic pressure level of the high-frequency and reducing the ratio, achieving the goal of optimization. However, with the increasing power, sawtooth waveforms will appear, and the absorption of acoustic waves by the medium will increase significantly, therefore, the equivalent length will be limited, so there is a certain limit to improve the efficiency by increasing the power. But the conversion efficiency is related to the characteristics of the medium. By changing the medium, the conversion efficiency can be improved by using a medium with a low acoustic velocity, a low density and a larger nonlinear coefficient.

Figure 2:
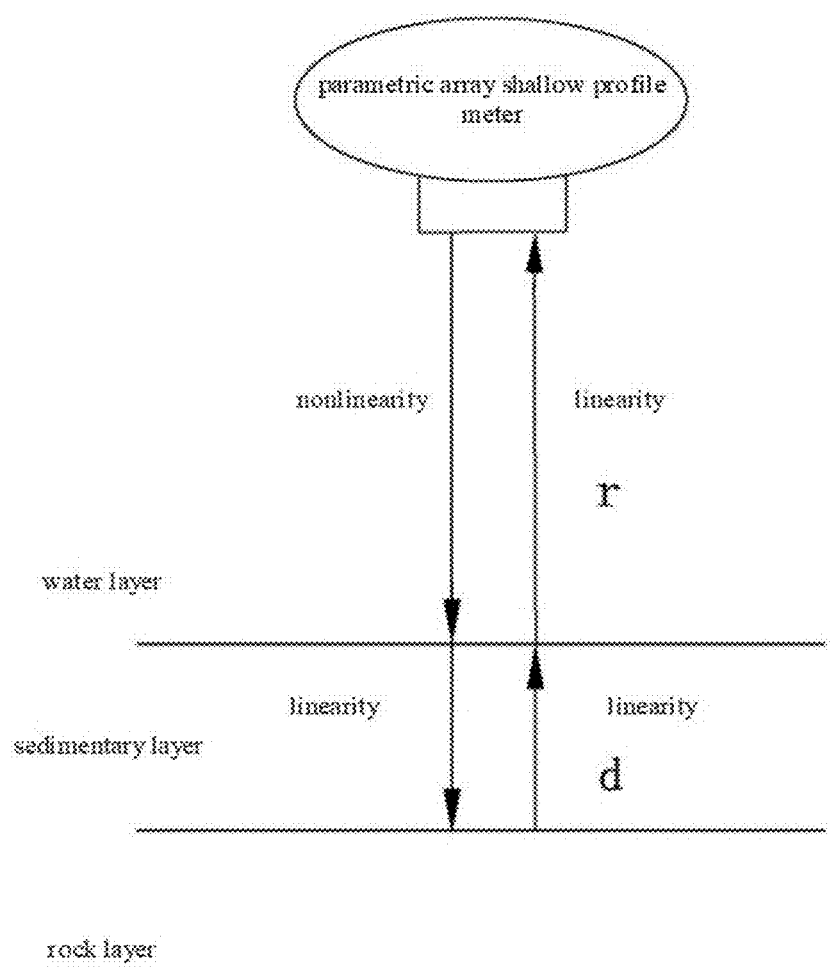
FIG. 2 is a schematic diagram of the acoustic wave propagation path of the parametric array shallow profile in the water body.
Figure 3:
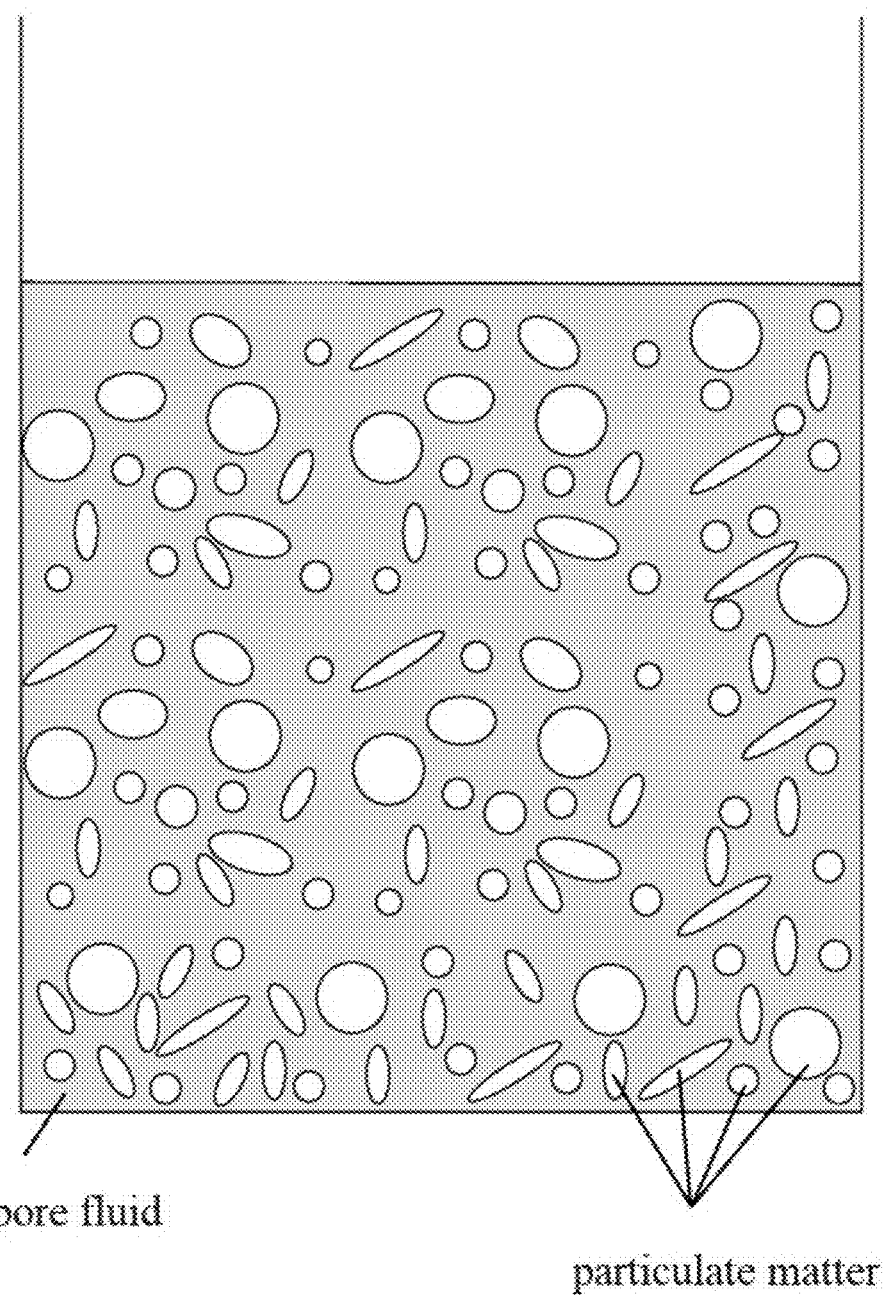
FIG. 3 is a schematic diagram of pore fluid with particles in sediment.

Based on the above principles, as shown in FIG. 1-2, the method for optimization of a parametric array shallow profile difference frequency conversion performance considering the wave propagation path between the sensor and the top of the rock formation on the ground profile, comprising the following steps:

S1: building a three-layer parametric array shallow profile emission acoustic wave propagation path model, the three-layer parametric array shallow profile emission acoustic wave propagation path model includes a water layer, a sedimentary layer and a rock layer; as shown in FIG. 3, the sedimentary layer is a pore fluid formed by particles, and establishing a detection horizontal position DL equation capable of detecting a detection performance of the parametric array shallow profile and estimating an echo level at a ground profile and a top of a rock formation:

$$DL = SL - (PG + DL_{W \cdot S} + AL_W) - TL_{W \cdot S} - AL_S - RL_{S \cdot R} - TL_{S \cdot W} + RVS + RG + SPG;$$

since the loss in water is less than the loss in sediments and rocks, the initial wave absorption loss in water is ignored in the general equation;

the SL is a horizontal position of an acoustic wave emission source, the PG is a generation efficiency from an initial wave frequency to the difference frequency, the $DL_{W \cdot S}$ is a diffusion loss of an initial wave in a water and the sedimentary layer, and the $AL_W$, is an absorption loss of the initial wave in the water, a unidirectional wave propagation between a transducer and a surface of a sediment is regarded as a nonlinearity and a wave propagation of the transducer reflected from the surface of the sediment is regarded as a linearity; the $TL_{W \cdot S}$ is a transmission loss of the initial wave at a boundary between the water layer and the sedimentary layer and the $TL_{S \cdot W}$ is the transmission loss of an echo at the boundary between the water layer and the sedimentary layer; the $AL_S$ is the absorption loss of the initial wave in the sediment; the $RL_{S \cdot R}$ is a reflection loss at the boundary between the sediment and the rock layer; the RVS is a voltage sensitivity of an acoustic echo receiving hydrophone; the RG is a gain of the receiving hydrophone; and the SPG is a signal processing gain of the receiving hydrophone;

S2: building a model for optimization of the parametric array shallow profile difference frequency conversion performance and calculating a low-frequency wave radiation power $W_{ed}$:

$$W_{ed} = \frac{\rho_f e^{\alpha_S r}}{2\rho_S c_S} 4\pi r$$

$$= \frac{w^4 \beta^2 w_1 w_2}{2\pi \rho_S c_S^7 \gamma};$$

a propagation distance of the acoustic wave in water is r, the propagation distance in the sediment is d; and a propagation speed of the acoustic wave in water is $c_R$, the propagation speed of the acoustic wave in the sediment is $c_S$, and the propagation speed of the acoustic wave in a rock is $c_W$, the unit is m/s, a water density is $\rho_W$, a sediment density is $\rho_S$, and a rock density is $\rho_R$ and the unit is kg/m³; an attenuation coefficient of the acoustic wave absorbed in the sediment is $\alpha_S$, and unit is dB/m; the β is a porosity of the sediment, the e is an expansion rate of a member attached to the model for optimization of the parametric array shallow profile difference frequency conversion performance, and the γ is a structure factor of a transmitted acoustic wave propagation path model;

wherein, the $w_1$ and the $w_2$ are frequencies of two high-frequency frequencies respectively, since the frequencies of two high-frequency frequencies are similar, $$w_1 = w_2 = \frac{w}{2}$$

and the w is a total radiated wave frequency; the $\rho_f$ is a pore fluid density in the sediment, and $\rho_s = \beta \rho_f + (1-\beta) \rho_g$ and the $\rho_g$ is a particulate matter density in the sediment;

S3: calculating a low-frequency wave conversion efficiency, and the low-frequency wave conversion efficiency is a ration of a low-frequency wave frequency $W_{ed}$ to the total radiated wave frequency W:

$$\frac{W_{ed}}{W} = 2\pi^3 \beta^2 f_d^4 W / \rho_S c_S^7 \gamma^2$$

the $f_d$ is a differential frequency;

S4: adjusting and increasing a high-frequency power and a high-frequency acoustic pressure level and reducing the ratio $$\frac{W_{ed}}{W} = 2\pi^3 \beta^2 f_d^4 W / \rho_S c_S^7 \gamma^2$$

to improve a conversion efficiency $$\frac{W_{ed}}{W}.$$

Under the condition that the acoustic wave emission source is 1 m away from the transducer and a bidirectional distance diffusive loss is −6 db/DD, the ALS=2 $\alpha_S$d DLW·S=20 log 2(r+d), and ALS=2$\alpha_S$d.

An acoustic wave loss caused by going back and forth between a water surface and the sediment is a sum of $TL_{W \cdot S}$ and $TL_{S \cdot W}$:

$$TL_{W \cdot S} + TL_{S \cdot W} = -20 \log 2(1 + R_{W \cdot S})(1 - R_{W \cdot S}), \text{ and}$$

$$R_{W \cdot S} = \frac{\rho_S c_S - \rho_W c_W}{\rho_S c_S + \rho_W c_W};$$

and the $R_{W \cdot S}$ is a reflection coefficient at the water surface and the sediment.

The $RL_{S \cdot R} = -20 \log(R_{S \cdot R})$, $$R_{S \cdot R} = \frac{\rho_R c_R - \rho_S c_S}{\rho_R c_R + \rho_S c_S}$$

the $R_{S \cdot R}$ is the reflection coefficient at the sediment and the rock.

In order to adapt to different types of sediments and avoid the inaccuracy of the final applied nonlinear parameters, which results in a poor optimization of conversion efficiency, it is necessary to calculate the transmission loss and reflection losses of the echo in the sediment. The transmission loss and the reflection loss in an echo sediment are related to the $\rho_S$, $c_S$ and $\alpha_S$, and calculating $\rho_S$, $c_S$ and $\alpha_S$ by establishing Biot-Stoll model, and the Biot-Stoll model is based on the consideration that the three-layer model constructed will carry out the overall frame movement in the water body and will absorb water and expand in the water body:

$$\nabla^2 (He - C\xi) = \frac{\partial^2}{\partial t^2}(\rho e - \rho_f \xi);$$

$$\nabla^2 (He - M\xi) = \frac{\partial^2}{\partial t^2}(\rho_f e - m\xi) - \frac{F\eta}{k}\frac{\partial \xi}{\partial t};$$

wherein, the expansion rate of a member attached to the model for optimization of the parametric array shallow profile difference frequency conversion performance is e=div(u, U), and a fluid volume flowing into or out of a volume unit attached to the model for optimization of the parametric array shallow profile difference frequency conversion performance is ξ=β div(u-U,U), the f is the porosity of the sediment, the u is a position after the parametric array shallow profile is moved, the U is the position after the pore fluid is moved and the η is a flow velocity of the pore fluid; the div function is a result of finding a quotient and a remainder of two parameters; the H is a calculation weighting parameter of the expansion rate e, the C is the calculation weighting parameter of the fluid volume ξ flowing into or out of a volume unit attached to the model for optimization of the parametric array shallow profile difference frequency conversion performance, the M is the calculation weighting parameter of a volume variation of the fluid volume ξ, and the m is the structure factor of the transmitted acoustic wave propagation path model.

The H formula is as following:

$$H = \frac{(K_g - K_b)^2}{D - K_b} + K_b + \frac{4}{3}u;$$

the $K_b$ is frame bulk modulus, and the $K_g$ is particle bulk modulus;

the C formula is as following:

$$C = \frac{K_g(K_g - K_b)}{D - K_b};$$

the M formula is as following:

$$M = \frac{K_g^2}{D - K_b};$$

the m formula is as following:

$$m = \gamma \frac{\rho_f}{\beta};$$

the D formula is as following:

$$D = K_g \left[1 + \beta\left(\frac{K_g}{K_f} - 1\right)\right];$$

the $K_f$ is the bulk modulus of the pore fluid.

The structure factor of the transmitted acoustic wave propagation path model γ formula comprising:

$$\gamma = 1 + g\left(\frac{1-\beta}{\beta}\right);$$

and the g is a radius of the particles in the sediment.

Establishing a detection horizontal position DL equation capable of detecting a detection performance of the parametric array shallow profile and estimating an echo level at a ground profile and a top of a rock formation and a Biot-Stoll model to evaluate the performance of PSBP system and to improve the measuring system, especially in terms of frequency setting.

Figure 4:
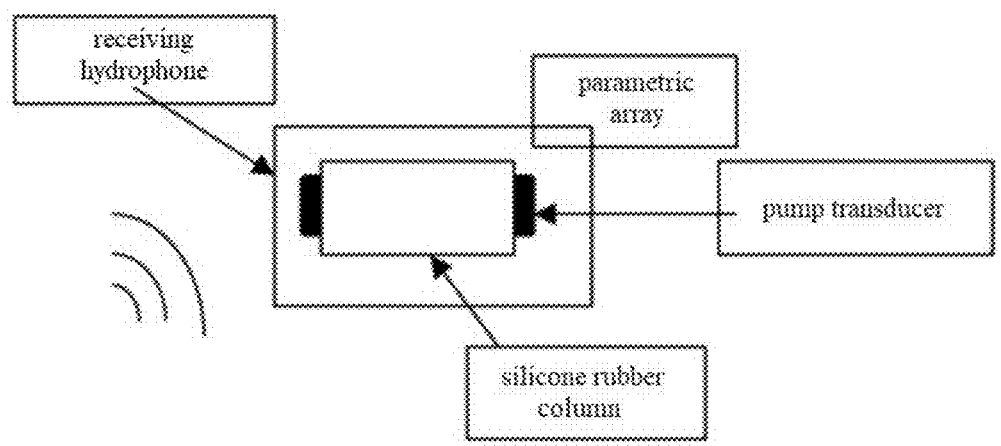
FIG. 4 is a schematic diagram of the structure of the parametric receiving array.

As shown in FIG. 4, the present disclosure provides a parametric receiving array adopting the method for optimization of a parametric array shallow profile difference frequency conversion performance, and the parametric receiving array includes the receiving hydrophone and a pump transducer, comprising: a silicone rubber column is added between the receiving hydrophone and the pump transducer to improve the conversion efficiency of the parametric receiving array. Furthermore, the optimized parametric array shallow profile and narrow beam without sidelobe are further used, reducing the sound virtual image and reverberation of other reflectors. Therefore, the parametric receiving array which is suitable for detection in slopes where submarine hydrothermal deposits can be found on and in the irregular surface areas is able to emit a highly directional acoustic beam, thereby improving the positioning accuracy of the detection target. Meanwhile, the parametric receiving array can optimize the shallow profile of some parameter arrays to meet the low-frequency power consumption mode. And the parametric receiving array can be installed on autonomous underwater robots to detect buried sediments in deep sea areas and reduce the power consumption of autonomous underwater robots.

Due to the increase of the non-linear coefficient of the silicone rubber medium and the decrease of the acoustic velocity, the beam width has a sharper reducing directivity, and the conversion efficiency is improved. Therefore, in the parameter receiving array composed of pump transducer and receiving hydrophone, the conversion efficiency of the parametric array receiving array can be improved by adding silicone rubber columns to the transducer and the receiving hydrophone.

Although the present disclosure has been described with reference to the preferred embodiments, without departing from the scope of the present disclosure, various modifications can be made to the disclosure and the components therein can be moved with equivalents. In particular, as long as there is no structural conflict, the various technical features mentioned in the various embodiments can be combined in any manner. The present disclosure is not limited to the specific embodiments disclosed in the text, but includes all technical solutions falling within the scope of the claims.

What is claimed is:

1. A method for optimization of a parametric array shallow profile difference frequency conversion performance, comprising the following steps:

S1: building a three-layer parametric array shallow profile emission acoustic wave propagation path model, the three-layer parametric array shallow profile emission acoustic wave propagation path model includes a water layer, a sedimentary layer and a rock layer; the sedimentary layer is a pore fluid formed by particles, and establishing a detection horizontal position DL equation capable of detecting a detection performance of the parametric array shallow profile and estimating an echo level at a ground profile and a top of a rock formation:

$$DL=SL-(PG+DL_{W \cdot S}+AL_W)-TL_{W \cdot S}-AL_S-RL_{S \cdot R}-TL_{S \cdot W}+RVS+RG+SPG;$$

the SL is a horizontal position of an acoustic wave emission source, the PG is a generation efficiency from an initial wave frequency to a difference frequency, the $DL_{W \cdot S}$ is a diffusion loss of an initial wave in a water and the sedimentary layer, and the $AL_W$ is an absorption loss of the initial wave in a water, and a unidirectional wave propagation between a transducer and a surface of a sediment is regarded as a nonlinearity and a wave propagation of the transducer reflected from the surface of the sediment is regarded as a linearity; the $TL_{W \cdot S}$ is a transmission loss of the initial wave at a boundary between the water layer and the sedimentary layer and the $TL_{S \cdot W}$ is the transmission loss of an echo at the boundary between the water layer and the sedimentary layer; the $AL_S$ is the absorption loss of the initial wave in the sediment; the $RL_{S \cdot R}$ is a reflection loss at the boundary between the sediment and the rock layer; the RVS is a voltage sensitivity of a receiving hydrophone for an acoustic echo; the RG is a gain of the receiving hydrophone; and the SPG is a signal processing gain of the receiving hydrophone;

S2: building a model for optimization of the parametric array shallow profile difference frequency conversion performance and calculating a low-frequency wave radiation power $W_{ed}$:

$$W_{ed} = \frac{\rho_f e^{\alpha_S r}}{2\rho_S c_S} 4\pi r;$$

$$= \frac{w^4 \beta^2 w_1 w_2}{2\pi \rho_S c_S^7 \gamma};$$

a propagation distance of an acoustic wave in the water is r, the propagation distance in the sediment is d; and a propagation speed of the acoustic wave in the water is $c_R$, the propagation speed of the acoustic wave in the sediment is $c_S$, and the propagation speed of the acoustic wave in a rock is $c_W$; a water density is $\rho_W$, a sediment density is $\rho_S$, and a rock density is $\rho_R$; an attenuation coefficient of the acoustic wave absorbed in the sediment is $\alpha_S$; the $\beta$ is a porosity of the sediment, the e is an expansion rate of a member attached to the model for optimization of the parametric array shallow profile difference frequency conversion performance, and the $\gamma$ is a structure factor of a transmitted acoustic wave propagation path model;

wherein, the $w_1$ and the $w_2$ are frequencies of two high-frequency frequencies respectively, since the frequencies of the two high-frequency frequencies are similar, $$w_1 = w_2 = \frac{w}{2}$$

and the w is a total radiated wave frequency; the $\rho_f$ is a pore fluid density in the sediment, and $\rho_s=\beta\rho_f+(1-\beta)\rho_g$ and the $\rho_g$ is a particulate matter density in the sediment;

S3: calculating a low-frequency wave conversion efficiency, and the low-frequency wave conversion efficiency is a ratio of a low-frequency wave frequency $W_{ed}$ to a total radiated wave frequency W:

$$\frac{W_{ed}}{W} = 2\pi^3 \beta^2 f_d^4 W / \rho_S c_S^7 \gamma^2;$$

the $f_d$ is a differential frequency;

S4: adjusting and increasing a high-frequency power and a high-frequency acoustic pressure level and reducing the ratio $$\frac{W_{ed}}{W} = 2\pi^3 \beta^2 f_d^4 W / \rho_S c_S^7 \gamma^2$$

to improve a conversion efficiency.

$$\frac{W_{ed}}{W}.$$

2. The method for optimization of the parametric array shallow profile difference frequency conversion performance according to claim 1, wherein:
under the condition that the acoustic wave emission source is 1 m away from the transducer and a bidirectional distance diffusive loss is −6 db/DD, the ALS=2 $\alpha_S$d DLW·S=20 log 2(r+d), and ALS=2$\alpha_S$d.

3. The method for optimization of the parametric array shallow profile difference frequency conversion performance according to claim 1, wherein:
an acoustic wave loss caused by going back and forth between a water surface and the sediment is a sum of $TL_{W \cdot S}$ and $TL_{S \cdot W}$:

$$TL_{W \cdot S}+TL_{S \cdot W}=-20 \log 2(1+R_{W \cdot S})(1-R_{W \cdot S}), \text{ and}$$

$$R_{W \cdot S} = \frac{\rho_S c_S - \rho_W c_W}{\rho_S c_S + \rho_W c_W};$$

and the $R_{W \cdot S}$ is a reflection coefficient at the water surface and the sediment.

4. The method for optimization of the parametric array shallow profile difference frequency conversion performance according to claim 1, wherein: $RL_{S \cdot R}=-20 \log(R_{S \cdot R})$, $$R_{S \cdot R} = \frac{\rho_R c_R - \rho_S c_S}{\rho_R c_R + \rho_S c_S};$$

the $R_{S-R}$ is the reflection coefficient at the sediment and the rock.

5. The method for optimization of the parametric array shallow profile difference frequency conversion performance according to claim 1, wherein:

the echo has a transmission loss and the reflection loss in the sediment, the transmission loss and the reflection loss in an echo sediment are related to the $\rho_S$, $c_S$ and $\alpha_S$, and establishing a Biot-Stoll model to calculate $\rho_S$, $c_S$ and $\alpha_S$:

$$\nabla^2 (He - C\xi) = \frac{\partial^2}{\partial t^2}(\rho e - \rho_f \xi);$$

$$\nabla^2 (He - M\xi) = \frac{\partial^2}{\partial t^2}(\rho_f e - m\xi) - \frac{F\eta}{k}\frac{\partial \xi}{\partial t};$$

wherein, the expansion rate of a member attached to the model for optimization of the parametric array shallow profile difference frequency conversion performance is e=div(u, U), and a fluid volume flowing into or out of a volume unit attached to the model for optimization of the parametric array shallow profile difference frequency conversion performance is ξ=β div(u-U,U), the β is the porosity of the sediment, the u is a position after the parametric array shallow profile is moved, the U is a position after the pore fluid is moved and the η is a flow velocity of the pore fluid; the div function is a result of finding a quotient and a remainder of two parameters; the H is a calculation weighting parameter of the expansion rate e, the C is the calculation weighting parameter of the fluid volume ξ flowing into or out of a volume unit attached to the model for optimization of the parametric array shallow profile difference frequency conversion performance, the M is the calculation weighting parameter of a volume variation of the fluid volume ξ, and the m is the structure factor of the transmitted acoustic wave propagation path model.

6. The method for optimization of the parametric array shallow profile difference frequency conversion performance according to claim 5, wherein: a H formula is as following:

$$H = \frac{(K_g - K_b)^2}{D - K_b} + K_b + \frac{4}{3}u;$$

wherein: the $K_b$ a frame bulk modulus, and the $K_g$ is a particle bulk modulus;
a C formula is as following:

$$C = \frac{K_g(K_g - K_b)}{D - K_b};$$

a M formula is as following:

$$M = \frac{K_g^2}{D - K_b};$$

a m formula is as following:

$$m = \gamma \frac{\rho_f}{\beta};$$

and the m is the structure factor of the transmitted acoustic wave propagation path model;
a D formula is as following:

$$D = K_g\left[1 + \beta\left(\frac{K_g}{K_f} - 1\right)\right];$$

the $K_f$ is a bulk modulus of the pore fluid.

7. The method for optimization of the parametric array shallow profile difference frequency conversion performance according to claim 1, wherein: a γ formula is as following:

$$\gamma = 1 + g\left(\frac{1 - \beta}{\beta}\right);$$

and the g is a radius of the particles in the sediment.

* * * * *